OPTICAL SYSTEM FOR REPRODUCTION MACHINES

Filed Feb. 3, 1965 9 Sheets-Sheet 1

INVENTORS
DAVID C. HARPER
GEORGE G. HART
RICHARD M. BOBBE
BY
ATTORNEYS

INVENTORS
DAVID C. HARPER
GEORGE G. HART
RICHARD M. BOBBE
BY [signature]
[signature]
ATTORNEYS INVENTORS
DAVID C. HARPER
GEORGE G. HART
RICHARD M. BOBBE
BY [signature]
ATTORNEYS May 9, 1967 R. M. BOBBE ETAL 3,318,186

OPTICAL SYSTEM FOR REPRODUCTION MACHINES

Filed Feb. 3, 1965 9 Sheets-Sheet 4

INVENTORS
DAVID C. HARPER
GEORGE G. HART
BY RICHARD M. BOBBE

ATTORNEYS

OPTICAL SYSTEM FOR REPRODUCTION MACHINES

Filed Feb. 3, 1965

9 Sheets-Sheet 5

INVENTORS
DAVID C. HARPER
GEORGE G. HART
BY RICHARD M. BOBBE
ATTORNEYS

INVENTORS
DAVID C. HARPER
GEORGE G. HART
RICHARD M. BOBBE
BY

ATTORNEYS

INVENTORS
DAVID C. HARPER
GEORGE G. HART
RICHARD M. BOBBE
BY [signature]
ATTORNEYS

INVENTORS
DAVID C. HARPER
GEORGE G. HART
RICHARD M. BOBBE
BY
ATTORNEYS

INVENTORS
DAVID C. HARPER
GEORGE G. HART
RICHARD M. BOBBE
BY
ATTORNEYS

United States Patent Office 3,318,186
Patented May 9, 1967

3,318,186

OPTICAL SYSTEM FOR REPRODUCTION MACHINES

Richard M. Bobbe, David C. Harper, and George G. Hart, Rochester, N.Y., assignors to Xerox Corporation, Rochester, N.Y., a corporation of New York Filed Feb. 3, 1965, Ser. No. 430,020
1 Claim. (Cl. 88—24)

This invention relates to improvements in optical systems and, particularly, to improvements in systems of this type to facilitate the making of enlarged xerographic reproductions from minified text on opaque cards.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem the mere protection of the records of a business may be considered. As a safeguard against destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent, first, since the primary purpose was to remove the microfilm records from everyday use and, second because of the relative inaccessibility of selected records contained on such microfilms.

Recently, there has been developed a system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon. However, the use of aperture cards has required the added expense in the provision of apparatus for microfilming records and for mounting the microfilm frames on processing cards.

In the use of the conventional microfilm reproduction apparatus, the microfilm card comprises a conventional record card of the type widely used in record-controlled accounting and tabulating systems, but is provided with an aperture in which a microfilm frame may be inserted and permanently secured to the card. When a microfilm frame of data to be reproduced is so mounted in a microfilm card, the card may also be key punched with appropriate holes and notches representing certain descriptive terms defining, identifying, or relating to the microfilm picture and placed in an index file. Thereafter, these cards may be manually or machine sorted and otherwise processed when the index file is interrogated in accordance with conventional uses of such cards. It will be apparent then that the use of microfilm aperture cards requires the practice of many processing steps and the need for corresponding equipment to practice the process.

However, the use of such microfilm cards has made it possible to effect substantinal savings in the reproduction of minified records when compared to other systems for the preservation of records. Nevertheless, from the standpoint of producing card information, microfilm systems require conventional photographic projection equipment to produce the microfilm information. This involved cumbersome, costly and time-consuming photographic developing techniques that detracted substantially from the overall efficiency of the system.

More recently there has evolved another form of information retrieval utilizing the standard EAM punch card and index system. Instead of implanting microfilm frames within apertures formed in cards, this new form of information storage requires merely printing in minified size the information or data from a document upon the opaque area of a card that would normally have contained the microfilm frame. In the use of this form, the information or data is reduced in size by 3× as distinguished from the conventional 15× or 20× for microfilm aperture cards thus enabling the operator to quickly and directly scan the data on the card for determining relevance for his purpose without the need for projectors, viewers, or the like. This advantage together with the particular advantage that these cards may be duplicated with greater ease than is the case for aperture cards thereby permitting more extensive dissemination of the information on a card renders this new form of information storage and retrieval a serious competitor of the aperture card system.

The present invention is particularly adapted for use in the scanning equipment that provides a light line for illuminating opaque cards and projecting the images rays therefrom. As previously stated, a typical minified data or information card contemplated herein is the type which has printed thereon a typical record in miniature size formed thereon by a suitable printing process such as, for example, by xerography.

By means of the present invention it is possible to reproduce information from processing cards conveniently, economically, and at a rate of speed that contributes substantially to the utility and effectiveness of minified record systems. This is effected by means of an improved optical system and card handling mechanism wherein minified data cards may be reciprocally moved relative to an optical scanning system and have their printed information projected onto the sensitized surface of a rotating xerographic drum after which an enlarged reproduction of the minified data area is quickly and accurately transferred to a desired support surface.

The principal object of the invention is to improve optical scanning systems for use in minified data reproduction processing systems.

A further object of the invention is to integrate card handling apparatus with an optical scanning system to enable compatible operation of opaque cards with xerographic processing systems.

These and other objects of the invention are attained by means of an improved optical system working in conjunction with a card handling apparatus for moving cards containing minified data past the optical axis of a projection system in timed relation to the movement of a sensitized xerographic plate whereby the image of the minified data is effective to form an electrostatic latent image on the xerographic plate in an enlarged configuration of the minified data area. Furthermore, the card handling apparatus may be positioned relative to the axis of the optical system, as desired, whereby cards having different longitudinal dimensions may be processed without loss of time or waste of material.

A preferred form of the invention is shown in the accompanying drawings in which.

Figure 1:
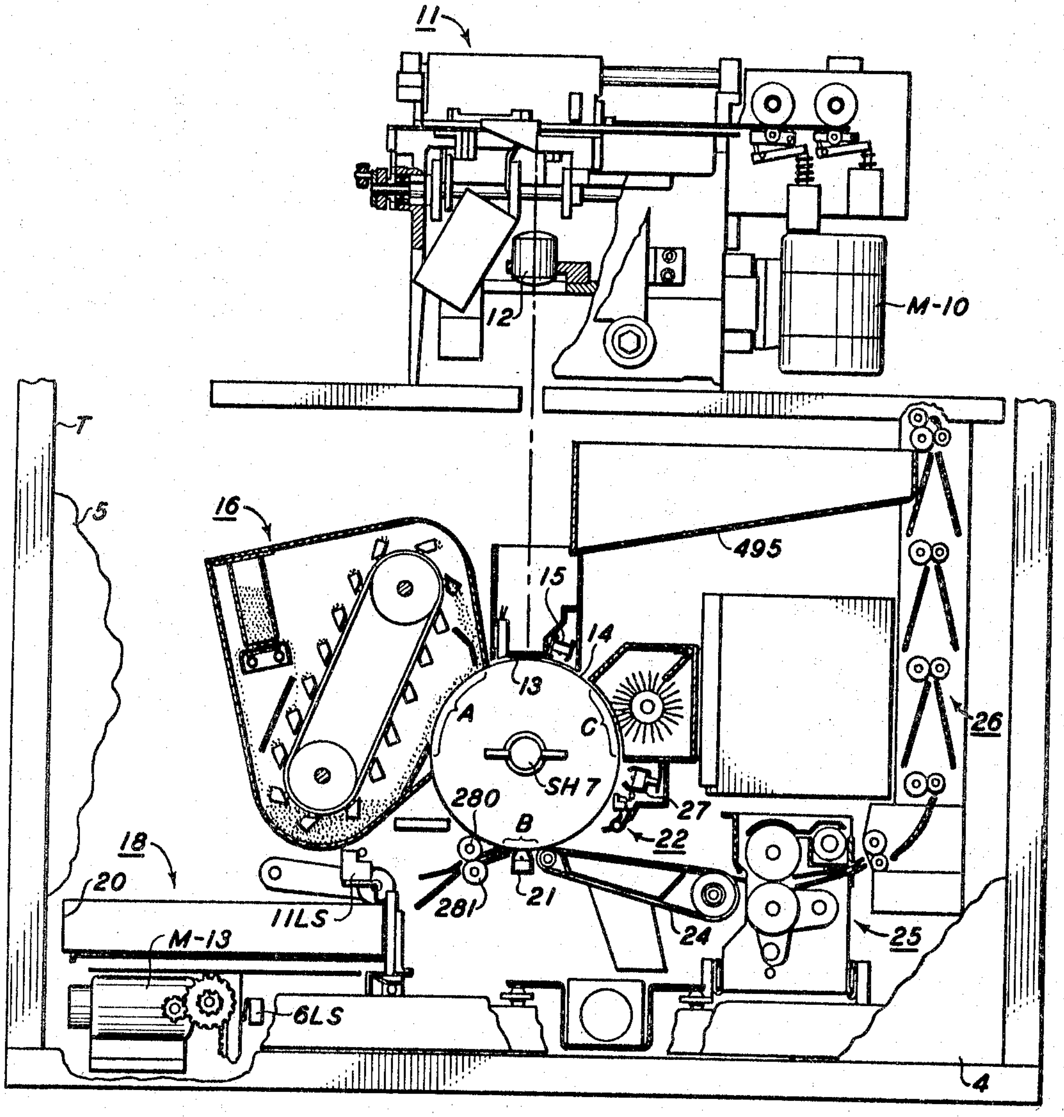
FIG. 1 illustrates schematically the preferred embodiment of a xerographic reproducing apparatus adapted for automatic operation, and incorporating a toner dispensing control system constructed in accordance with the invention.

For a general understanding of the xerographic processing system in which the invention is incorporated, reference is had to FIG. 1 in which the various system components are schematically illustrated. As in all xerographic systems, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by a fusing device, whereby the powder image is caused permanently to adhere to the support surface.

In the system disclosed herein, minified data cards are placed in the card magazine from which they are fed seriatim to a card carriage in a card handling apparatus, generally designated by reference character 11. Suitable driving means are provided for the card carriage whereby it is caused to move the card past the optical axis of a light projecting system to be described hereinafter for the purpose of scanning the minified data across a scanning light line. The illuminated card is projected downwardly by means of an objective lens assembly 12 and through a variable slit aperture assembly 13 and onto the surface of a xerographic plate in the form of a drum 14.

The xerographic drum 14 includes a cylindrical member mounted in suitable bearings in the frame of the machine and is driven in a counterclockwise direction by a motor at a constant rate that is proportional to the scan rate for the minified data card, whereby the peripheral rate of the drum surface is identical to the rate of movement of the reflected light image. The drum surface comprises a layer of photoconductive material on a conductive backing that is sensitized prior to exposure by means of a screened corona generating device 15.

The exposure of the drum to the light image discharges the photoconductive layer in the areas struck by light, whereby there remains on the drum a latent electrostatic image in image configuration corresponding to the light image projected from the minified data card. As the drum surface continues its movement, the electrostatic latent image passes through a developing station A in which there is positioned a developer apparatus 16 from which developing material is cascaded onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 17 is used to accurately meter toner to the developing material.

Positioned next and adjacent to the developing station is the image transfer station B which includes a sheet feeding mechanism adapted to feed sheets of paper successively to the developed image on the drum at the transfer station. This sheet feeding mechanism, generally designated 18, includes a sheet source such as a tray 20 for a plurality of sheets of a suitable transfer material that is typically, sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 21 that is located at or immediately after the point of contact between the transfer material and the rotating drum. The corona transfer device 21 is substantially similar to the corona discharge device 15 in that it includes an array of one or more corona discharge electrodes that are energized from a suitable high potential source and extend transversely across the drum surface and are substantially enclosed within a shielding member.

In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pick-off mechanism, generally designated 22, for removing the transfer material from the drum surface. This device includes a plurality of small diameter, multiple outlet conduits of a manifold that is supplied with pressurized aeriform fluid through the outlet conduits into contact with the surface of the drum slightly in advance of the sheet material to strip the leading edge of the sheet material from the drum surface and to direct it onto a horizontal conveyor 23 having an endless conveyor 24 whereby the sheet material is carried to a fixing device in the form of a fuser assembly 25, whereby the developed and transferred xerographic powder image on the sheet material is permanently fixed thereto.

After fusing, the finished copy is preferably discharged from the apparatus at a suitable point for collection externally of the apparatus. To accomplish this there is provided a vertical conveyor, generally designated 26, by means of which the copy is delivered to a copy holder positioned in a suitable super-structure overhanging the rear portion of the desk top.

The next and final station in the device is a drum cleaning station C, having positioned therein a corona precleaning device similar to the corona charging device 15, to impose an electrostatic charge on the drum and residual powder adheres thereto to aid in effecting removal of the powder, drum cleaning device adapted to remove any powder remaining on the xerographic drum after transfer and a source of light, not shown, whereby the xerographic drum is flooded with light to cause dissipation of any residual electrical charge remaining on the xerographic drum.

In general, the electrostatic charging of the xerographic drum in preparation for the exposure step and the electrostatic charging of the support surface to effect transfer are accomplished by means of corona generating devices whereby electrostatic charge on the order of 500 to 600 volts is applied to the respective surface, in each instance. Although any one of a number of types of corona generating devices may be used, a corona charging device of the type disclosed in Vyverberg Patent 2,836,725 is used for both the corona charging device 15 and the corona transfer device 21, each of which is secured to suitable frame elements of the apparatus and connected to a suitable electrical circuit.

Figure 2:
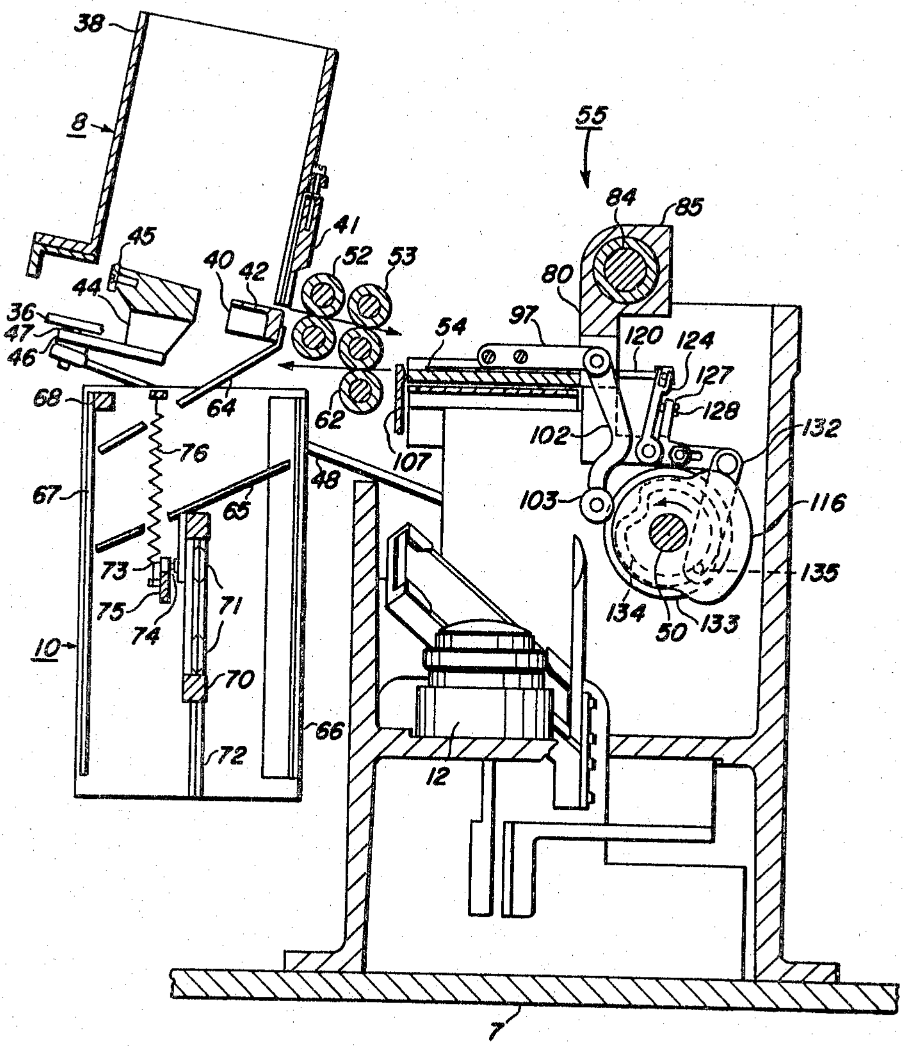
FIG. 2 is a side elevation, partly in section, of the card handling apparatus for the invention.

The card feeding apparatus comprises the several devices that serve to feed minified data cards seriatim from card magazine 8 (see FIG. 2) to a card carriage whereby they are moved past an optical system that is effective to project the minified data image onto the xerographic drum one or more times, in accordance with the number of copies required. After projection of the required number of light images, the card is ejected from the card carriage and is deposited in the receiving magazine.

Figure 3:
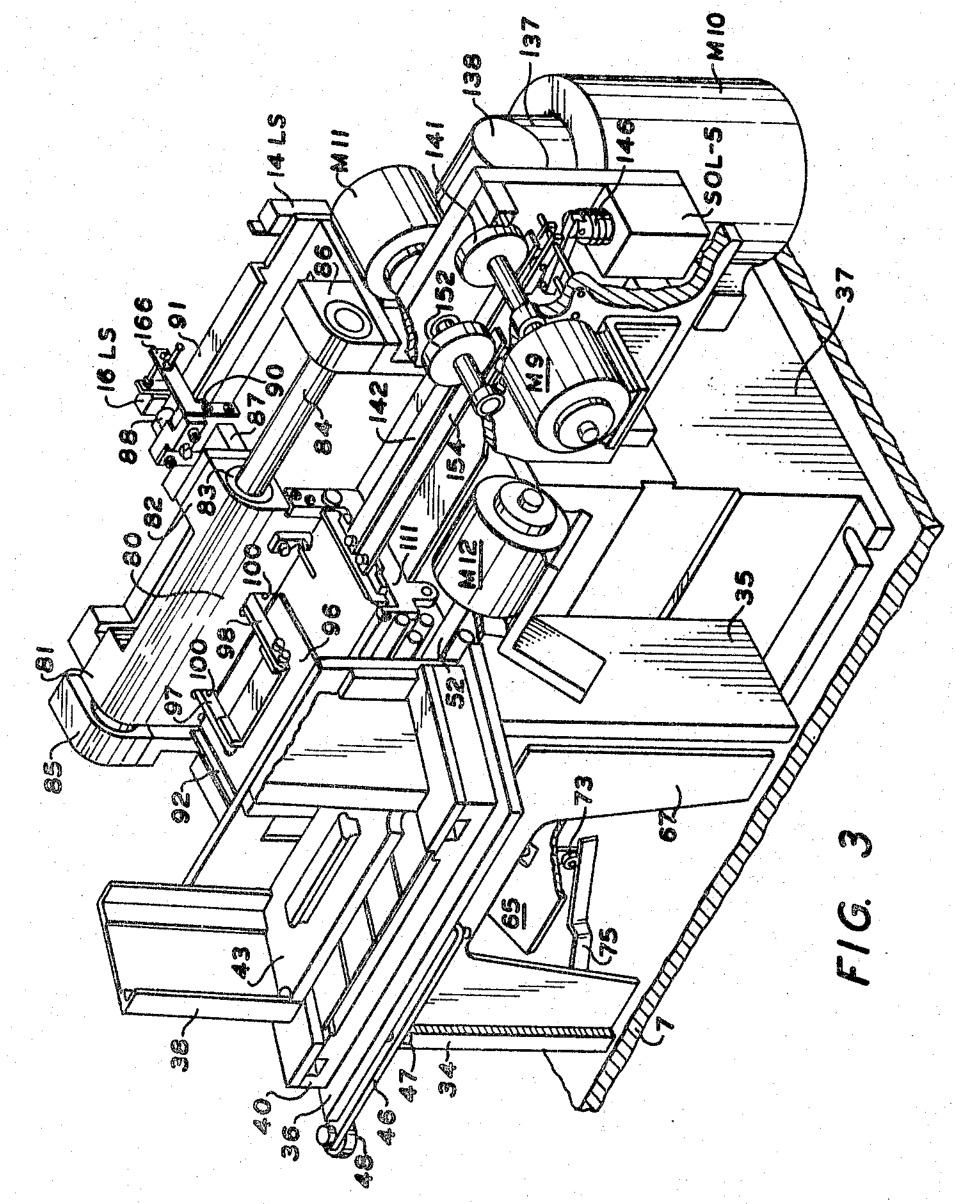
FIG. 3 is a perspective view of the card handling apparatus, as seen from the front of the machine.

For convenience of assembly and adjustment, the card feeding apparatus, as shown in FIG. 3, is mounted on a rigid frame consisting of side plates 34 and 35 and a top plate 36 that is integrally connected with the side plates. Side plates 34 and 35 are also connected at their lower ends on a base casting 37 that serves to support the entire card handling apparatus and, in turn, is supported on plate 7 of base section for the machine.

Seriatim feeding of the cards is effected by means of an apparatus that is an adaptation of that disclosed in copending application Ser. No. 159,402, filed Dec. 12, 1961, now U.S. Patent No. 3,180,637, issued Apr. 27, 1965, in the name of R. A. Hunt. Minified data cards are placed in card magazine assembly 8 that includes vertical guide members 38 for holding a stack of cards in alignment, and base member 48 for supporting the weight of the card stack which, in turn, is supported on frame plate 36. The magazine is arranged to permit the feeding of cards from the bottom of the card stack, and an adjustable throat knife assembly 41 is provided at the exit slot 42 of the magazine to retain the remaining cards in the stack as each bottom card is removed. A card weight 43 is provided to hold the cards in proper feeding relation.

For moving each card out of the magazine, the apparatus includes a movable base block 44 that supports the trailing edge of the card stack and is provided with an adjustable pickerknife 45 that is arranged to engage the trailing edge of the lowermost card of the stack. Base block 44 is mounted in suitable ways for sliding movement toward and away from the exit slot of the magazine, and is reciprocated in timed relation to the operation of the remainder of the card handling apparatus. For this purpose, a lever 46 is pivotally mounted on a stud 47 fixed in the frame plate 36 and is connected to the base block 44 by a suitable screw. The other end of lever 46 is connected to a crank rod 48 which, in turn, is pivotally connected to a crank arm 49 keyed on a cam shaft 50 (see also FIG. 4). As described below, the cam shaft 50 is rotated periodically through a single revolution clutch, in timed relation to the remainder of the mechanism, whereby a single card is advanced from card magazine 8, as required.

As each card leaves magazine 8, it is gripped successively by two sets of feed rolls 52 and 53 and advanced rearwardly to a card carriage 54 of a reciprocable carriage assembly, generally designated by reference character 55. For this purpose, both sets of feed rolls 52 and 53 are journaled for rotation in supporting brackets 56 and 57 that are secured on side plate 34 and 35, respectively, and the upper rolls are resiliently urged into engagement with the lower rolls by springs 58. For driving the feed rolls, the shaft of lower roll 52 extends through bracket 56 and is connected to the drive shaft of a motor M12 that rotates continuously while the apparatus is in operation. The remaining rolls are positively driven through pinions 60 fixed on each feed roll shaft and an idler pinion 61 mounted on bracket 57, whereby the two super rolls of the sets 52 and 53 are rotated clockwise, as viewed in FIGS. 3 and 5, and lower rolls of the sets 52 and 53 are rotated counterclockwise to advance the card to card carriage 54, which at this point of operation is directly aligned with the feed rolls to receive the card.

Immediately thereafter, the card carriage 54 is moved to the right, in a path of movement normal to the card feeding movement, to effect the image scanning operation. After the minified data is scanned, the carriage 54 is returned to a position in alignment with the feed rolls and the card is ejected from the carriage, as described below. Thereupon, it is engaged by the lower feed roll 53 that is in frictional contact with an idler feed roll 62 that is rotatably mounted in a pair of arms 63, pivoted on the side plates 34 and 35, and is resiliently urged into contact with the feed roll 53. The continued driving action of feed roll 53 is thereby effective to move the card forwardly against a deflector plate 64 that causes the card to drop downwardly and come to rest on a support plate 65 in receiving magazine 10.

The receiving magazine includes suitable vertical guide members 66 to confine the movement of the cards rearwardly, and a gate member 67 is fixed on a rod 68 that is rotatably mounted in the side plates 34 and 35. The gate member 67 is effective to maintain the cards in a vertical stack but may conveniently be swung outwardly by rotating the member outwardly, whereby the operator may remove cards from the machine. The support plate 65 of the magazine is secured on a rectangular frame assembly 70 having rollers 71 that ride in vertical grooves 72 in the side plates 34 and 35, whereby the support plate 65 is guided for vertical movement. A roller 73 is mounted on a stud 74 fixed in frame assembly 70 and rides on a lever 75 that is pivotally mounted in the side plate 35. A spring 76 is extended between lever 75 and the magazine frame to urge frame assembly 70 and support plate 65 upwardly, when there are no cards in the magazine. This construction minimizes the possibility of cards tumbling as they are ejected from the card carriage 54, and, at the same time, provides a support plate structure that moves downwardly as additional cards are added, against the tension of the spring 76, whereby a substantial number of cards may be stacked in the receiving magazine before it is necessary for the operator to remove them.

In the event of a misfeed of a card or in the event the supply of cards in card magazine 8 becomes exhausted, means are provided to stop the machine to enable the operator to make the necessary adjustments. For this purpose, a "card detector" limit switch 12LS is mounted on the back plate 77 of the card magazine 8. This switch functions in conjunction with the electrical circuit for the apparatus to keep the several operating circuits energized as long as switch 12LS is actuated during the period in which a card is supposed to be passed through feed rolls 52 and 53. For this purpose, a switch-actuating element 78 extends downwardly between the upper feed rolls 52 and 53 and into the path of movement of the cards. Engagement of each card with actuating element 78 serves to maintain the desired circuitry energized. In the event there is a failure to feed a card, the switch 12LS is not actuated and the circuit is thereby broken to stop the machine.

The card carriage assembly receives each minified data card from the feed rolls and carries it through the scanning cycle, i.e., the "scan" or exposure stroke and the return stroke, during continuous operation of the machine. In the normal stopping position of the system, the carriage assembly 105 is positioned at the end of its scan stroke of movement, in which it is out of register with the card magazine assembly 8. When the system is restarted, carriage 54 is immediately returned to a position in register with feed rolls 52 and 53 of the card magazine assembly to receive the next card for reproduction. The carriage is held momentarily in this position to permit the ejection of a card carried thereby, if any, and to receive a new card carriage and its several related operating mechanisms function to effect the several mechanical movements and electrical circuit connection of the card handling operation in proper sequence.

Figures 6, 7:
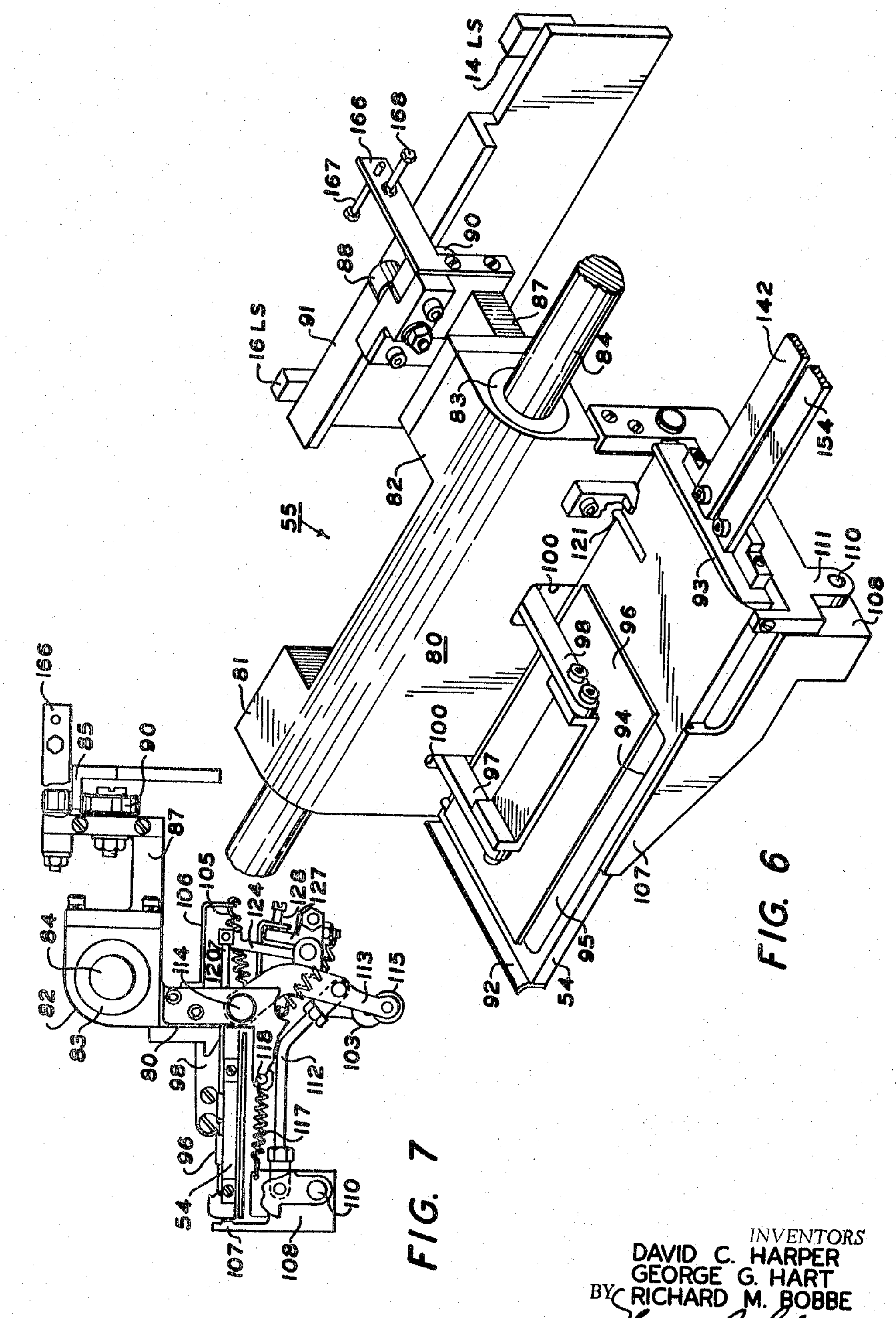
FIG. 6 is an isometric view of the card carriage, as seen from the front of the machine.
FIG. 7 is a schematic sectional elevation of the card ejecting and card holding mechanisms of the card handling apparatus.

Specifically, card carriage assembly 55 includes the generally horizontally disposed card carriage 54 (see FIGS. 7 and 8) that is formed of a casting having a flat top surface or platen for supporting cards and a generally vertically disposed backing plate 80 to which the carriage 54 is secured along its rear edge. The plate 80 extends upwardly and is formed with bosses 81 and 82 through which is formed a longitudinal bore having suitable linear ball bushings 83. The carriage is adapted for lateral movement, relative to the card magazine assembly, on a shaft 84 which extends within the bushings 83 and is mounted in frame plates 85 and 86 secured on base plate 37. To maintain the carriage assembly 55 horizontal, it is provided with an extension 87 upon which is mounted an upper roller 88 and two lower rollers 90 at axes at right angles to shaft 84 and which ride on the upper and lower surfaces, respectively, of a rail 91 secured to the base 37 and arranged parallel to shaft 84. By this structure, carriage assembly 55 is supported for movement on the shaft 84 while maintaining its card supporting surface in a substantially horizontal position throughout its path of movement.

For guiding minified data cards onto the carriage platen 54, card guides 92 and 93 are provided at opposite ends of the carriage. In order to project a light image from a minified data card supported on the carriage, a rectangular aperture 94 (see FIG. 6) is formed through the carriage 54. The aperture 94 is of a dimension slightly in excess of that of the minified data area imprinted on a card, and is positioned to underlie the data area when the card is positioned on the carriage. An optical glass insert 95 is positioned in the aperture 94 to provide a flat surface for supporting the minified data area.

For clamping the minified data area of a card in scanning position, there is provided a spring loaded, rectangular frame or pressure pad 96 (see FIG. 7) whereby, when the pad is positioned on a card held on the carriage, the pad securely presses the minified data area against the insert 95 in the carriage so that the minified data area is securely pressed in a horizontal plane during the scanning operation.

In order to actuate the pressure pad 96 to permit the insertion and removal of minified data cards, the pad is fixed to two arms 97 and 98 that extend through suitable openings 100 formed in the backing plate 80 and are pinned on a shaft 101 (see FIG. 8) rotatably journalled in the plate 80 across the openings 100.

For operating the pressure pad 96, a crank 102 is fixed to the shaft 101 and is provided with a cam follower 103 at its lower end that is adapted to be engaged by the high dwell of a cam 104 fixed on the cam shaft 50 which, as described below, is rotated through a single revolution by means of a single revolution clutch drive during each card feeding operation. The rigid crank assembly comprising pressure pad 96, arms 97 and 98 and the crank 102 are resiliently urged clockwise by a spring 105 extended between crank 102 and the outer edge of a bracket 106 fixed on the backing plate 80. The several parts of this assembly are so proportioned that they are limited in motion by contact between the pad 96 and the carriage surface so that the follower 103 is held slightly away from the low dwell of the cam 104 at this stage of operation.

For properly positioning a card on carriage 54 after it is fed thereto, the apparatus includes a line-up plate 107 (see FIG. 8), together with an actuating linkage. The plate 107 is formed with an offset lever portion 108 that is pivotally mounted on a stud 110 secured in a boss 111 on the underside of the carriage. A forked link 112 connects the mid-portion of a lever 113 mounted at its upper end on a rod 114 journaled in the backing plate 80. A follower 115 is rotatably mounted on the lower end of the lever 113 and is adapted to engage the high dwell of a cam 116 that is also fixed on cam shaft 50. A spring 117 is extended between a fixed anchor 118 and the upper portion of the lever portion 108 and functions to urge the plate 107 against the forward edge of carriage 54 and to urge the follower 115 into contact with the cam 116. However, the dimensions of the parts are such that contact between the plate 107 and the carriage limits the rearward movement of follower 115 to a position in which a slight clearance is maintained between it and the lower dwell of the cam 116.

In operation, the plate 107 is rocked counterclockwise immediately prior to the time a card is fed from feed rolls 53 so that the card has unimpeded passageway onto the card carriage. The high dwell of cam 116 is such that when a card is completely passed over the plate 107, the plate is restored to the position shown by the spring 117 and serves to urge the card rearwardly to place it accurately in scanning position.

Figure 8:
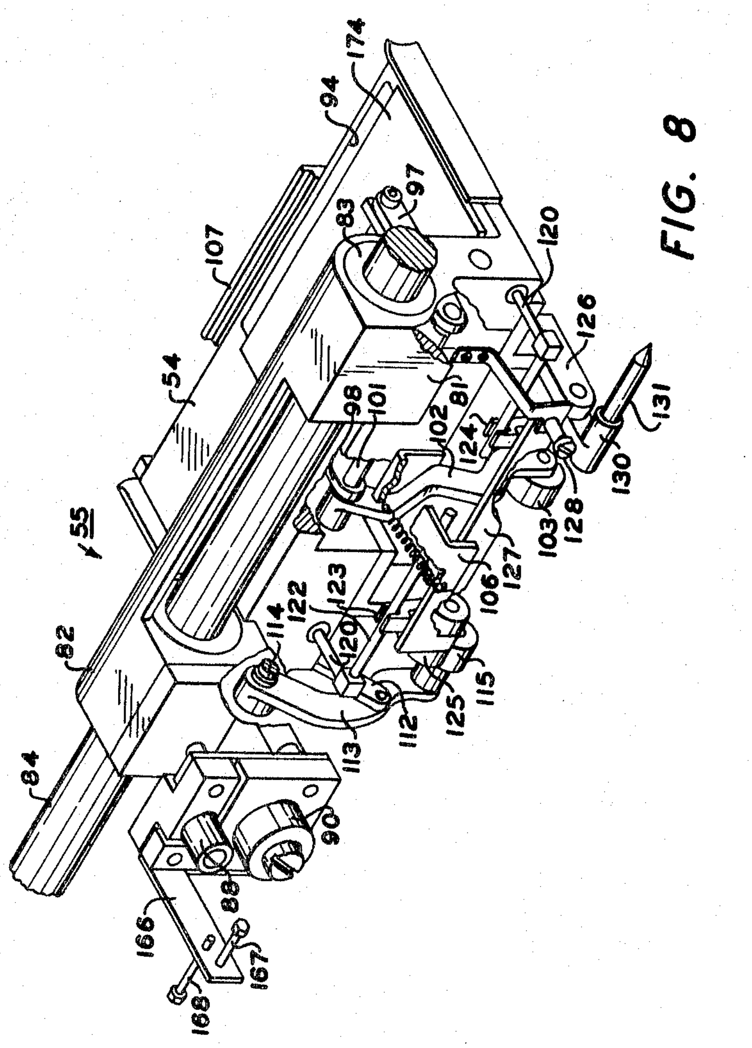
FIG. 8 is an isometric view of the card carriage, as seen from the rear of the machine and in relation to the operative structural details for card handling.

For ejecting a card during a card changing cycle, two ejector pins 120 are slidably journaled in bore 121 drilled through the plate 80 and extending for a slight distance onto the upper surface of carriage 54. The ejector pins 120 are normally held in their rearward position, as in FIG. 8, and are provided with squade forward ends that engage the rearward edge of a card positioned on the carriage 54. The rearward ends of pins 120 are connected to a transverse rod 122 that is rotatably retained between the arms of a pair of bifurcated cranks 123, 124 pivotally supported on suitable arms 125, 126, respectively, secured to the lower edge of the backing plate 80. Also pivotally supported on the arms 125, 126 along the pivotal axis for the cranks 123, 124 is a bar 127 having screws 128 threaded thereon which, when the bar is rotated in a counterclockwise direction as viewed in FIG. 8, are adopted to engage and rotate the cranks 123, 124 causing outward movement of the card ejector pins 120 along the carriage 54 for ejecting a card therefrom.

Figure 4:
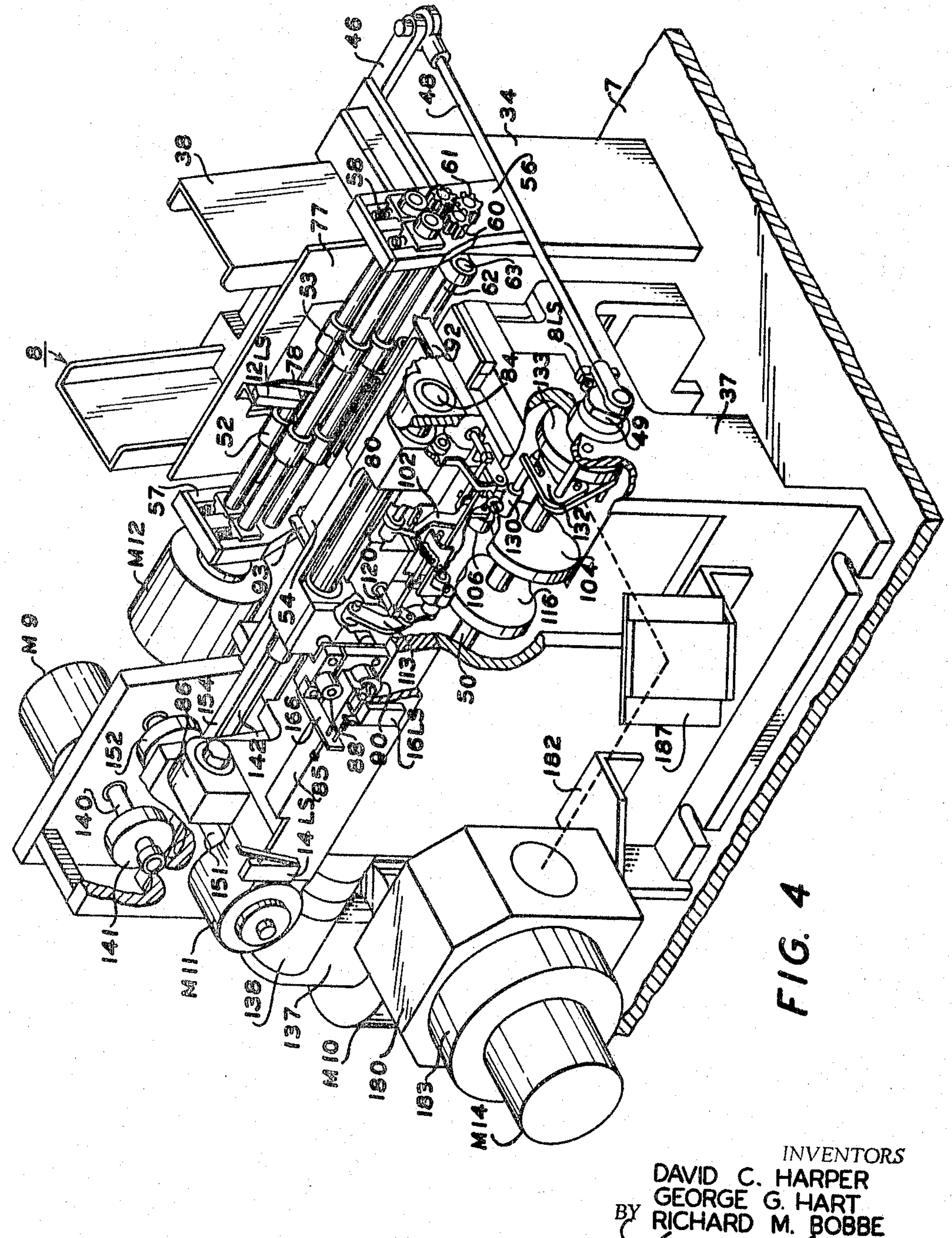
FIG. 4 is a perspective view of the card handling apparatus, as seen from the rear of the machine.

Rotation of the bar 127 in any direction is produced by an angled actuator member 130 in the form of a bell crank which is secured to the bar 127 adjacent the crank 124 and having a follower 131 extending rearwardly and laterally of the carriage assembly. The bell crank 130 is rocked to rotate the bar 127 about its axis by a lever 132 having a bifurcated end straddling the follower 131 and which itself is rotated for producing the rocking action by a cam 133 formed with a cam groove 134 on one side thereof. The lever 132 is suitably pivoted in the frame 34 and has a follower 135 extending into and cooperable with the cam groove. As shown in FIG. 4, during continuous rotation of the cam 133, which is secured to the cam shaft 50, the lever 132 is adopted for rotation in both directions.

For operating the several cam controlled mechanisms of card carriage assembly 55, as well as the card feeding mechanism there is provided a motor M10 that is supported on the top plate 7 and is connected to the cam shaft 50 through a gear reduction assembly 137 and a conventional solenoid actuated, single revolution clutch 138, whereby the several mechanisms are caused to function in time relation to the remainder of the mechanism. The motor M10 is driven continuously and is effective to drive the cam shaft 50 through a single revolution upon the energization of a solenoid SOL–3. When this occurs it is apparent from the cam contours shown in FIGS. 2 and 4 that the line-up plate 107 is first rocked clockwise to remove them from the path of movement of a card. Immediately thereafter, the pressure pad 96 is elevated to release the card, if any, held on the carriage 54. Thereupon, ejector pins 120 are effective to eject the card from the magazine and are immediately withdrawn to their rearward positions.

At this point, the crank 49 is effective to cause a new card to be advanced through feed rolls 52 and 53 and onto the card carriage. Immediately thereafter, the plate 107 is rocked counterclockwise to position the card accurately on the carriage. As this is accomplished, the pressure pad 96 is lowered to press the minified data area card into register with the scanning aperture in the carriage. During the rotation of cam shaft 50, the detent cam 98 is effective first, at about its midpoint of revolution, to actuate a "miss detector" relay switch 8–CR that functions in conjunction with the "card detector" switch 12LS to stop the system in the event of a misfeed; and second, immediately before the end of its rotational movement, to actuate an "end of cycle" switch 14LSB that functions to condition the related circuits for a scanning cycle of operation.

Figure 5:
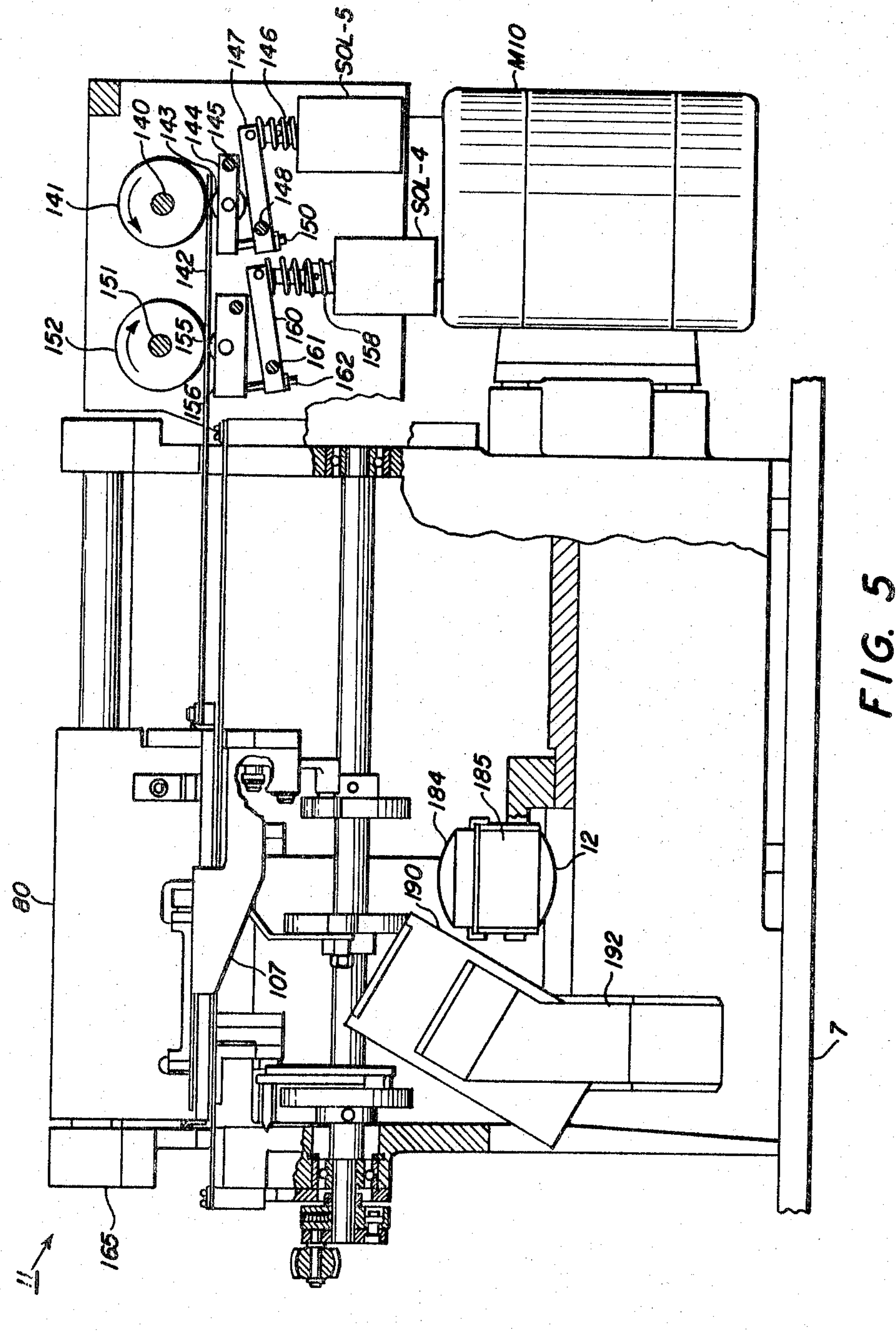
FIG. 5 is a front view, partly broken away of the drive mechanism utilized in the card handling apparatus.

For driving card carriage assembly 55 during the scanning operation, there is provided a driving arrangement for moving the carriage 54 at a predetermined, relatively slow speed during the "scan stroke," and at a relatively higher speed during the return stroke of the carriage. For this purpose, there is provided a constant speed, synchronous motor M9 (see FIGS. 3, 4 and 9) that is suitably secured in the frame of the machine and is provided with a drive shaft 140 having a roller 141 to effect a predetermined drive rate. Associated with roller 141 is a flat drive rod 142 which is of substantially rectangular cross-section and is secured to the right-hand end of carriage assembly 55. In the arrangement employed, as illustrated in FIG. 5, the drive rod 142 is spaced slightly from its associated drive roller and rests on an associated pinch roller 143 which is mounted on a substantially horizontal bar member 144 that is pivotally mounted on a pin 145.

In operation, motor M9 rotates continuously but is effective to drive the carriage assembly 55 only during the scanning stroke for the carriage when there is engagement between drive rod 142 and its respective drive roller 141. To effect engagement of drive rod 142 and drive roller 141 there is provided a solenoid SOL–4 that is mounted in the frame of the machine and has its armature 146 connected to one end of a lever 147 that is pivotally mounted near its other end on a pin 148 secured in the machine frame. At the extreme end of lever 147 adjacent pivot pin 148 there is provided an adjustable screw 150 that is set substantially in engagement with the lower face of bar 144. When the carriage is to be operated, the solenoid SOL–4 is energized, as described below, to rotate lever 147 clockwise and drive bar 144 clockwise to cause the roller 143 to force the drive rod 142 into frictional engagement with drive roller 141. By proper selection of the drive roll diameter, different driving ratios are obtained whereby, in each instance, the carriage assembly 55 is driven past the axis of the optical system at a rate directly proportional to the rotational speed of the xerographic drum in order to achieve exact synchronism between the moving card and the sensitized surface of the xerographic drum.

For driving the card carriage during the return stroke of the scanning operation, there is provided a return stroke motor M11 that is suitably secured on the frame of the machine. The motor M11 includes a drive shaft 151 having roller 152 to effect a rate of drive higher than the scanning drive rate. Within the roller 152 there is provided a slip clutch 153 for controlling the drive connection between the roller and the drive shaft 151. The return stroke drive includes a drive rod 154 of similar cross-sectional form as the rod 142 and is arranged in the same plane and parallel thereto. During a scanning stroke, the rod 154 is spaced slightly from its associated drive roller 152 and rests upon a pinch roller 155 which is mounted on a substantially horizontal bar 156 that is pivotally mounted on a pin 157.

In operation the motor M11 rotates continuously in the opposite direction to that of the motor M9 and is effective to drive the carriage assembly 55 only during the return stroke when there is engagement between the drive rod 154 and its respective drive roller 152. To effect this engagement there is provided a solenoid SOL–5 mounted on the machine frame having its armature 158 connected to one end of a lever 160 that is pivotally mounted near its other end on a pin 161 secured to the machine frame. At the extreme end of the lever 160, adjacent the pin 161, there is provided a screw 162 adjustable for engagement with the lower face of the bar 156. In both drive systems, the screws 150 and 162 are utilized for presetting the exact time at which the respective levers 147, 160 will engage the bars 144, 156, respectively, for effecting drive of the carriage.

Figures 9, 10:
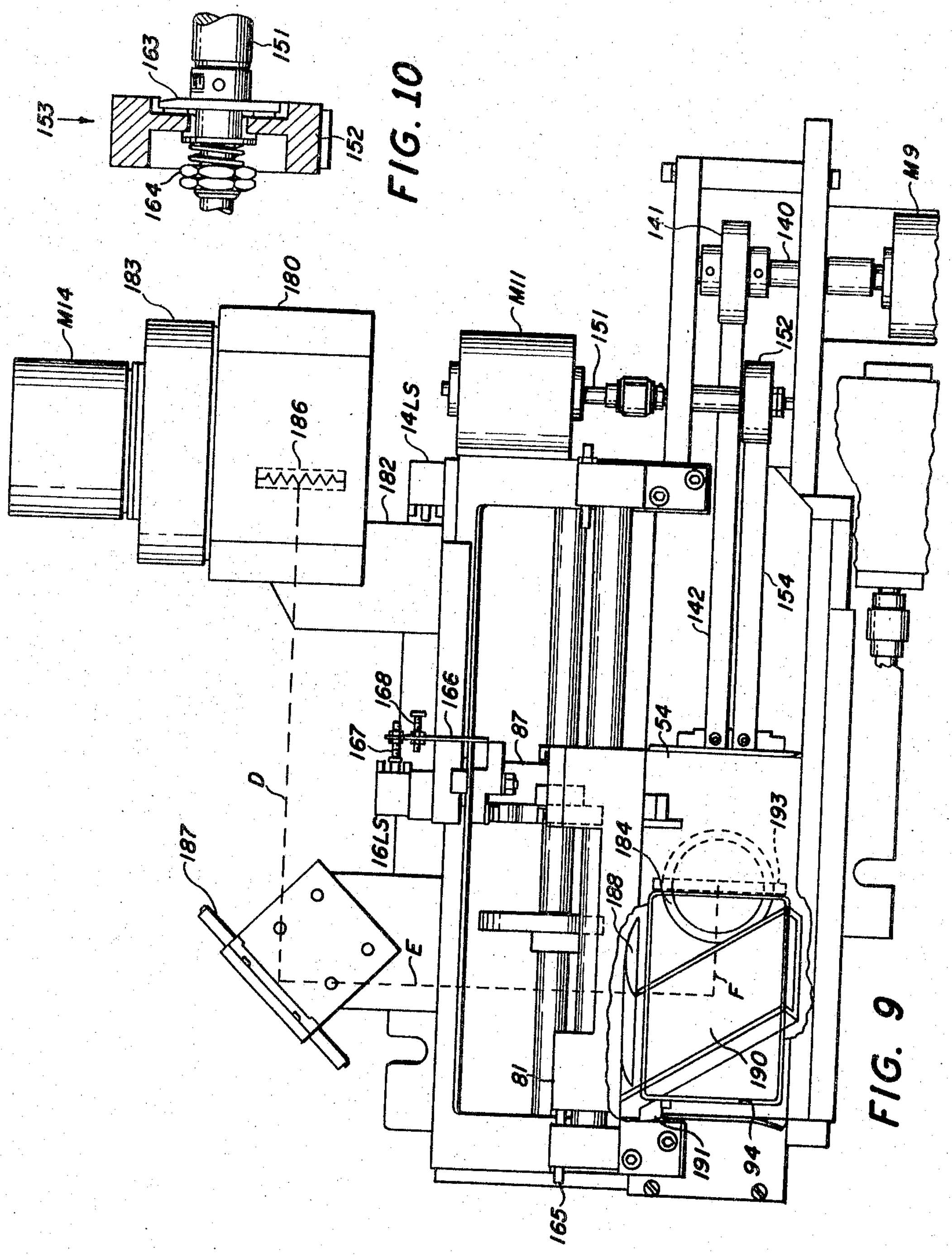
FIG. 9 is a plan view, partly broken away, of the card carriage in relation to the optical system for the machine.
FIG. 10 is a sectional view of a detail in FIG. 9.
Figure 11:
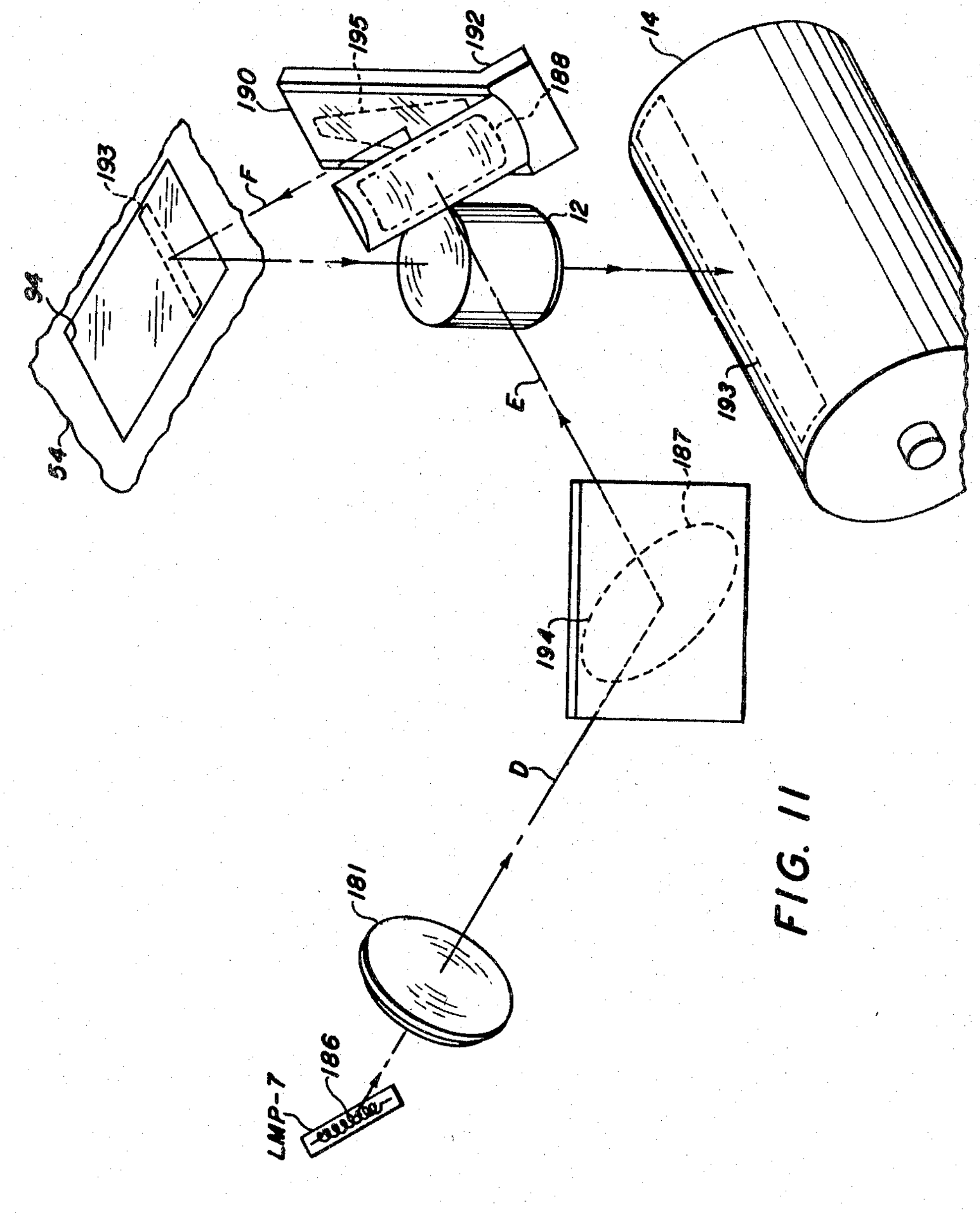
FIG. 11 is a schematized isometric view of the optical system.

The slip clutch 153 illustrated in FIG. 10 may be of conventional design and comprise a flat ring 163 secured to the end of the shaft 151 and frictionally engageable with an inner surface of the roller. A relatively light spring 164 biases the wheel against the ring to produce limited friction therebetween and, consequently, a drive connection between the ring and the wheel. However, this friction may be overcome when sufficient force is placed upon the wheel 152 whereupon the force will immobilize the roller while allowing continual rotation of the drive shaft. Such a force is produced when the drive rod 154 is held against longitudinal movement while the solenoid SOL–5 is energized to force the pinch roller 155 against the rod 154. In this event, the roller 152 may be completely immobilized because of its frictional engagement with the rod or slipping may result between the roller and the drive rod.

When the carriage is to be operated to its start-of-scan position during the return stroke, the solenoid SOL–5 is energized to rotate the lever 160 clockwise and drive bar 156 clockwise to cause the pinch roller 155 to force the drive rod 154 into frictional engagement with drive roller 152. When the carriage assembly 55 reaches the start-of-scan position, the boss 81 engages a stop 165 secured to the frame 37 and further movement of the carriage assembly and longitudinal movement of the drive rod 154 is prevented. In order to prevent inadvertent bouncing of the carriage assembly and to insure that the carriage assembly will remain in this position while a data card is being removed from the carriage and another positioned thereof by the card feeding device, the solenoid SOL–5 remains energized for permitting the continuance of the force produced by the drive roller 152 upon the drive rod 154 by action of the slip clutch 153.

The carriage assembly 55 includes an offset projecting plate 166 fixed on the bracket 87 and having mounted thereon two horizontally arranged but oppositely extending threaded elements 167, 168 each of which is adapted to cooperate with a limit switch. As the carriage assembly 55 moves to the right from its start of scan position the element 168 will approach and eventually actuate and close a limit switch 14LS that is fixed on the rearward edge of frame plate 34. The closing of switch 14LS is effective to complete a circuit to energize the carriage return solenoid SOL–5 for producing engagement of the drive roller 152 to the rod 154 and there impart movement of the carriage assembly on its return stroke and back to its start of scan position.

As carriage assembly 55 approaches its "start of scan" position, element 167 engages the actuating element on a limit switch 16LS that is fixed on frame plate 34. The actuation of switch 16LS signals the return of carriage assembly 55 to its "start of scan" position and is effective to initiate a repeat scan of the card on the card carriage or to effect the ejection of that card and the feeding of a new card, in accordance with the condition of the associated circuits.

Thus, there is provided a driving mechanism for moving carriage assembly 55 throughout the scanning cycle of operation. Throughout this cycle, the cam shaft 50 remains in the position shown in FIGS. 4 and 8 in which the followers 103, 115 and 131 of the carriage assembly actuating mechanism are opposite the low dwells of their respective cams 104, 116 and 133. Inasmuch as a slight clearance is provided between each follower and the low dwell of its respective cam, as described above, the several followers may conveniently be removed from alignment with their respective cams and then returned to proper alignment therewith during the movement of the carriage assembly, without the possibility of interference. Further details and a description of the operation of the card handling mechanism are disclosed in the copending patent application Ser. No. 422,804, filed on Dec. 31, 1964, in the name of Hewes et al.

*Optical system*

The projection optical system of the reproducing apparatus is used to form an image of the minified data area imprinted on a card on the carriage assembly as it moves through the scan stroke at a magnification ratio of approximately 3×, onto the sensitized surface of the xerographic drum.

The condensing optical system is used to illuminate the area to be copied and includes a lamp housing 180 which encloses a 650 watt tungsten filament lamp LMP–7; a biconvex lens 181; and a cylindrical strip lens 188. Two mirrors are located in the system for the purpose of bending the light beam around corners. The lamp housing is supported on a suitable standard 182 secured on the rearward face of the frame member supported on the frame 37. A suitable fan 183, driven by motor M14, is provided for cooling the projection lamp LMP–7 and lamp housing 180. Lamp LMP–7 is located approximately in the focal plane of lens 181 and is rotated a fixed amount from the vertical so that the lamp filament 186 is inclined about 30° from the vertical. Because the filament is approximately in the focal plane of lens 181, the light passing through lens 181 is rendered quasi-collimated.

The light beam travels along optical path D until it strikes mirror 187 which deviates the beam 90° from path D. Mirror 187 has a multi-coat surface so that the heat contained in the light beam is transmitted through the mirror while the useful shorter wavelengths are reflected along path E. After reflection from mirror 187 the still quasi-collimated beam travels to the cylindrical strip lens 188. The cylindrical lens is perpendicular to the optical path E but rotated about 30° from the vertical so as to accept the slightly rotated quasi-collimated light beam. The action of the cylindrical lens is to cause the width of the light beam to converge and come to a sharp focus in the general region of the card platen, while leaving the length of the light beam unaltered and therefore out of focus. The purpose of this is to form an in-focus image of the filament width thereby concentrating light in the width direction, while at the same time causing the filament coil structure to be absent by smearing the filament image lengthwise. In effect, one obtains a narrow band of homogeneously distributed light in the region of the card platen. The combined action of the two lenses of the condensing system also magnify the filament by about 3× thereby causing the light band on the card platen to be about three times wider than the filament itself. Just beyond the cylindrical lens is mirror 190 which is mounted with the cylindrical lens in bracket 191 which in turn is supported on a standard 192 secured to the base plate 7. Mirror 190 is set at the same angle as the cylindrical lens relative to the vertical but in addition is tilted 45° relative to the path E. The action of mirror 190 is to direct the converging light beam to the card platen along path F.

The data area of a card is illuminated by the filament image through the system 94 in carriage 54 and is then projected onto the selenium drum by the objective lens system 12 having an objective lens 184 mounted in an adjustable lens barrel 185. Preferably, the system employs a 4¼ inch, ƒ/6.3 lens for projecting the data area. The various paths for the optical axis of the system are so arranged that the card feeding assembly and carriage assembly can be positioned relative thereto in accordance with the size of the data area to be reproduced. In any relative setting of the card feeding assembly and carriage assembly with reference to the filament image, it is arranged that the filament image be at the extreme right-hand edge of the data area on the card, as viewed from the front of the machine, when the carriage assembly is in its "start of scan" position.

The objective lens 12 is stationary at all times and has the stationary filament image lying on its optical axis. The cylindrical lens and mirror 190 lie in the same plane as lens 12. It is therefore necessary that the light beam converging from the cylindrical lens and mirror 190 be directed toward the card platen at an angle. It is this necessity, combined with the need for having the filament image traverse the width of the aperture 94 and to fall upon the data area of a card along a transverse line, that precipitates the need for introducing 30° angles (relative to the vertical) of the filament, lens 188, and mirror 190. These angles make it possible to form the filament image between the sides of the aperture 94 and normal to the direction of movement of the carriage 54. The concentration of the light in the filament image 193 may be varied by the movement of the condenser lens 181 along the path D of the optical axis. This adjustment, in effect, varies the magnification of the filament image 193 in the event that this becomes desirable.

The light from the data area on the card passes through the objective lens system 12 and then through a variable aperture slit assembly 13, whereby the light intensity may be controlled, before the light reaches the surface of the xerographic drum 14. The variable slit aperture assembly 13 includes an outer housing 196 of U-shaped cross-section that extends transversely across the machine and is secured to the underside of the plate 7. Formed in the lower wall of the housing 196 for the assembly 13, as shown in FIG. 1, is a transverse slot that extends over the entire width of the xerographic drum 14.

To vary the overall light intensity that reaches the drum surface, the assembly 13 includes a removable masking element which is adapted to be retained in suitable grooves formed along the edges of the slot. The masking element may be provided with a narrow slit through which the light rays transmitted by lens 12 must pass in order to reach the drum surface. Since the light intensity on the drum surface is proportional to the width of the slit in the masking element, it will be apparent that the light intensity may be controlled by utilizing the masking elements having a slot width suitable for the particular light intensity desired. In this manner, the overall light intensity projected on the drum surface may be varied by removing one mask and inserting another in order to provide slits of different widths. In accordance with conventional projection techniques, any particular light slit chosen is of varying width, being wider at each end than it is in the middle, to insure uniform light intensity on the drum surface.

As mentioned earlier, the objective lens 12 forms an image of the exposed data area of a card on the selenium drum at a magnification of about 3×. With a .75 inch wide masking element located over the drum, a strip only .25 inch wide on the data card would be imaged onto the drum. It is necessary then that the .25 inch strip in the data card be fully illuminated with homogeneous light distribution. If one provides a filament image on the card platen only .25 inch wide and if the projection lamp should burn out, then the person replacing the lamp would have a critical alignment to perform. If instead the filament image on the card platen is more than .25 inch wide, then the lamp replacement need not be as critical since there is a wider spread of light than is needed. In order to obtain a filament image spread of more than .25 inch on the card platen, the card platen is located just outside of the plane where there the filament image is in sharpest focus. Beyond the focal plane the light beam begins to spread and therefore produces a broader band of light than would be found in the plane of best focus.

While the invention has been described with reference to the structure disclosed herein, it is not confined to the details set forth, and this application is intended to cover such modifications or changes as may come within the purposes of the improvements or the scope of the following claim.

What is claimed is:

In a card handling device for scanning opaque data cards for projection onto a light sensitive surface, the combination of:

a card carriage for carrying a card and being movable between start-of-scan and end-of-scan positions, an elongated source being tilted a predetermined angle relative to the vertical, a lens system for collimating light rays from said source, a cylindrical strip lens in the optical path of the collimated light rays and arranged with its axis tilted at said predetermined angle for converging the same in the width dimension of the elongated light source to produce an elongated, relatively narrow, beam of light to effect a light line in a predetermined focal plane, reflecting means interposed between said strip lens and said focal plane directing said elongated beam of light onto the data area of a card to position the longitudinal axis of the light line transverse to the direction of movement of a card as it is moved by the carriage between said positions, said data area being movable approximately in said focal plane of said cylindrical strip lens whereby said data area is illuminated and scanned by said light line as the card is moved between said positions, and means for projecting the image rays emanating from the illuminated opaque data area onto the light sensitive surface.

References Cited by the Examiner

UNITED STATES PATENTS 3,175,481 3/1965 Lahr ---------------- 88—24 X

NORTON ANSHER, *Primary Examiner.*

R. A. WINTERCORN, *Examiner.*